US012606120B2

(12) United States Patent
Skog

(10) Patent No.: US 12,606,120 B2
(45) Date of Patent: Apr. 21, 2026

(54) GAS GENERATOR COMPRISING REAGENT GASES

(71) Applicant: Autoliv Development AB, Vargarda (SE)

(72) Inventor: Klas Skog, Vargarda (SE)

(73) Assignee: Autoliv Development AB, Vargarda (SE)

( * ) Notice: Subject to any disclaimer, the term of this patent is extended or adjusted under 35 U.S.C. 154(b) by 139 days.

(21) Appl. No.: 18/301,008

(22) Filed: Apr. 14, 2023

(65) Prior Publication Data

US 2023/0339423 A1 Oct. 26, 2023

(30) Foreign Application Priority Data

Apr. 20, 2022 (FR) ...................................... 2203632

(51) Int. Cl.
B60R 21/268 (2011.01)
B60R 21/261 (2011.01)

(52) U.S. Cl.
CPC .... B60R 21/261 (2013.01); B60R 2021/2685 (2013.01)

(58) Field of Classification Search
CPC .............................................. B60R 2021/2685
See application file for complete search history.

(56) References Cited

U.S. PATENT DOCUMENTS

| | | | |
|---|---|---|---|
| 6,672,616 B2 * | 1/2004 | Jonsson | B60R 21/264 |
| | | | 137/68.13 |
| 9,365,183 B2 * | 6/2016 | Johanson | B60R 21/274 |
| 9,718,432 B2 * | 8/2017 | Aderum | B60R 21/272 |
| 2002/0130502 A1 | 9/2002 | Jonsson et al. | |
| 2015/0343987 A1 | 12/2015 | Aderum et al. | |

* cited by examiner

*Primary Examiner* — Jason D Shanske
*Assistant Examiner* — Joselynn Y Sliteris
(74) *Attorney, Agent, or Firm* — Harness, Dickey & Pierce, P.L.C.; Ryan W. Massey

(57) ABSTRACT

Gas generator comprising:
  a first chamber having first pressurized gases and a first outlet port,
  a second chamber with second pressurized gases and a second outlet port,
  a diffusion zone, arranged to receive and diffuse towards an airbag the first pressurized gases and the second pressurized gases,
wherein the first pressurized gases and the second pressurized gases are arranged to react together once they are mixed,
characterized in that the gas generator comprises at least one deflector arranged to impose on the first pressurized gases a first discharge trajectory in the separate diffusion zone of a second discharge trajectory of the second pressurized gases.

14 Claims, 3 Drawing Sheets

[Fig. 1]
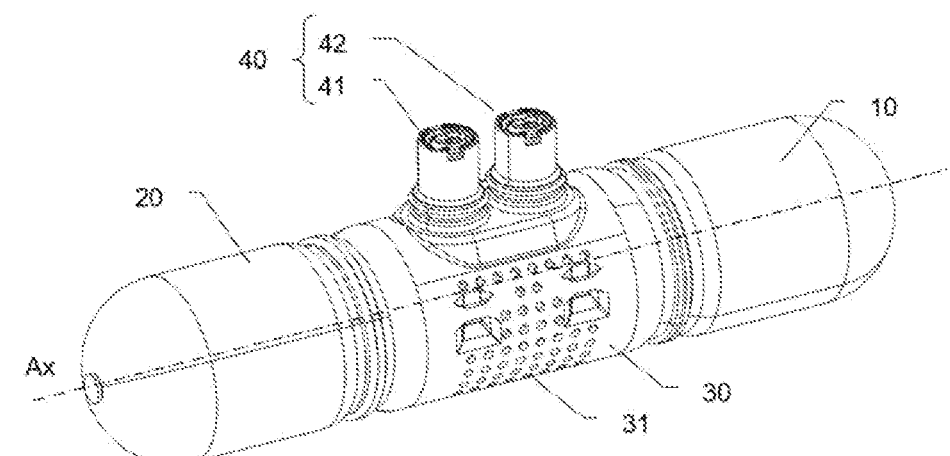
[Fig. 2]
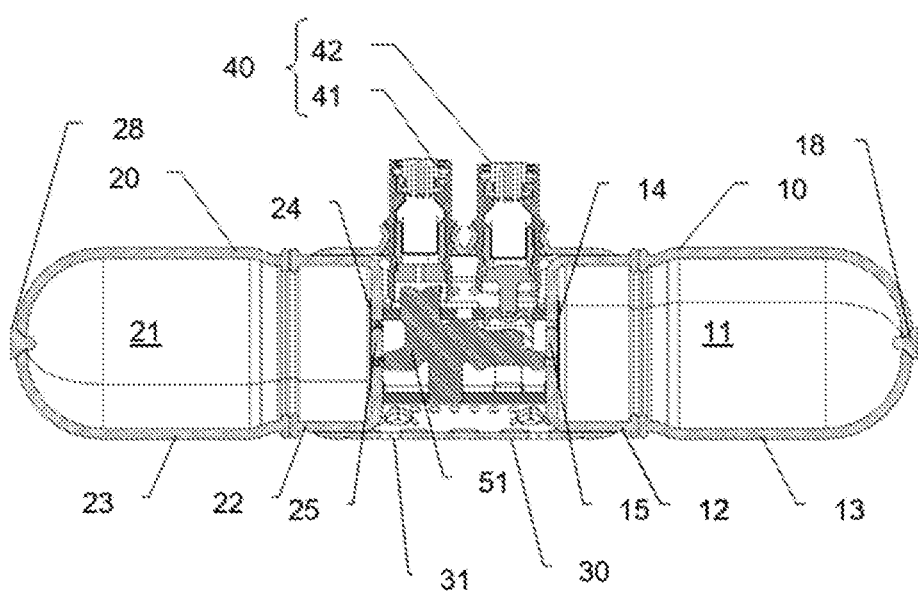

[Fig. 3]
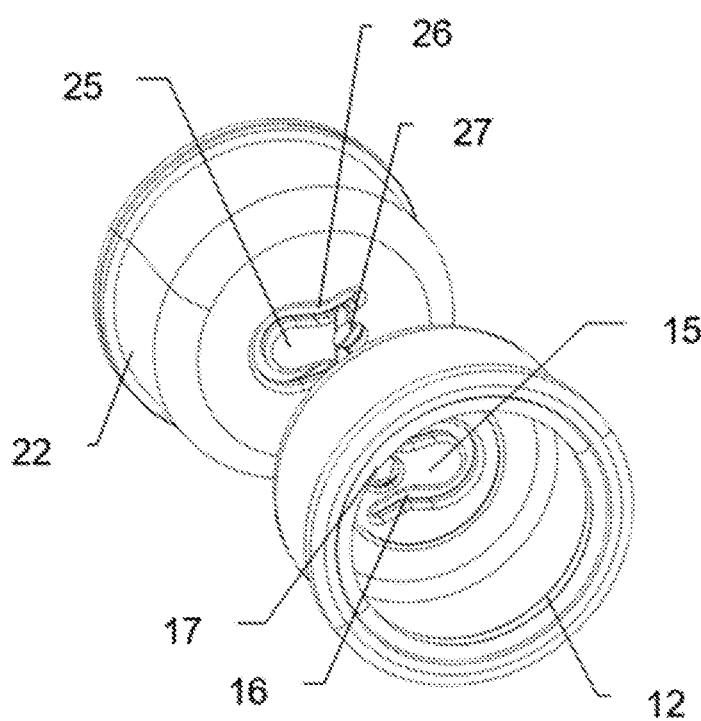

[Fig. 4]
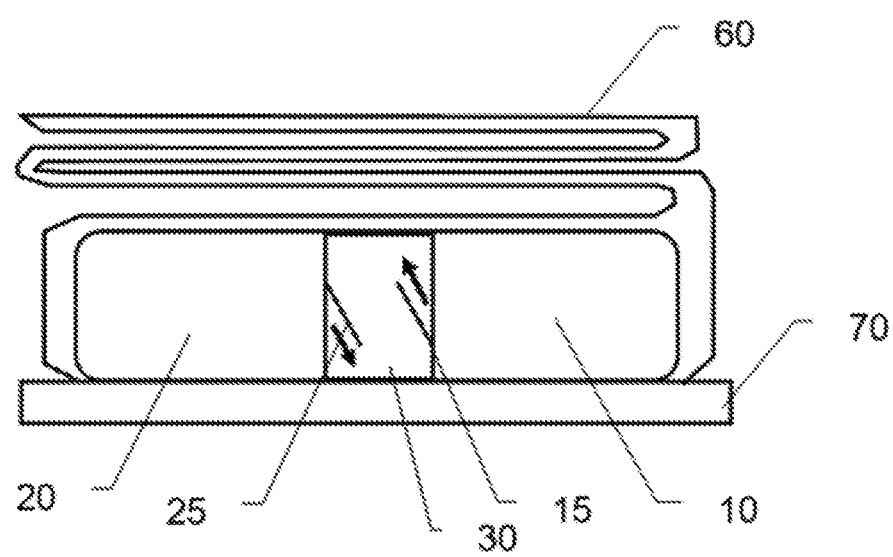
[Fig. 5]
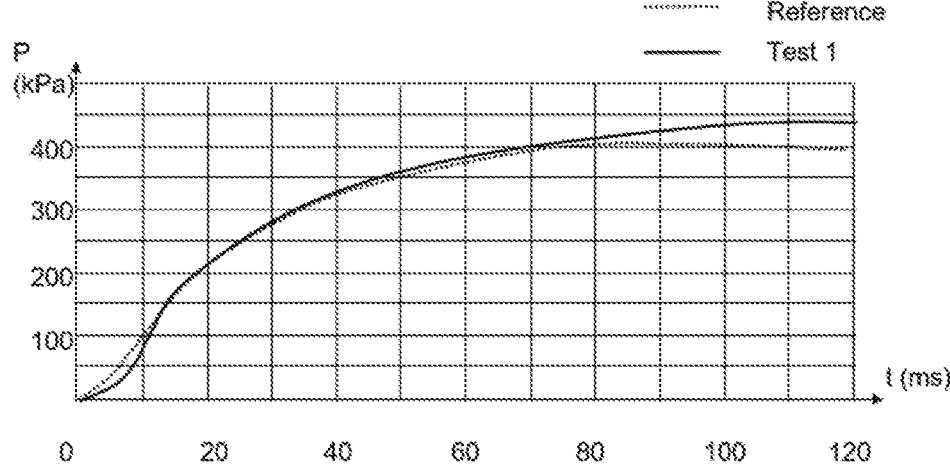

GAS GENERATOR COMPRISING REAGENT GASES

CROSS-REFERENCE TO RELATED APPLICATIONS

This application claims priority pursuant to 35 U.S.C. 119(a) to French Application No. 2203632, filed Apr. 20, 2022, which application is incorporated herein by reference in its entirety.

TECHNICAL FIELD OF THE INVENTION present invention generally relates to a gas generator for inflating an airbag of an automotive safety module. In particular, the invention relates to a gas generator comprising reagent gases, that is gases that can react together, such as hydrogen and oxygen.

STATE OF THE ART

In the gas generators of the background art, devices with two chambers each containing a reagent gas, such as hydrogen and oxygen, are known. Once released, the reagent gases can mix and react together, with for example combustion in a diffusion zone of the gas generator and/or in the airbag. On the other hand, these devices may have the disadvantage of mechanically stressing the airbag at the beginning of the operation when the airbag is deployed. In addition, it is important to correctly pressurize the airbag once it has been deployed in order to fulfill the coupling functions with the occupant and deceleration of the occupant.

DISCLOSURE OF THE INVENTION

One aim of the present invention is to respond to the disadvantages of the background art mentioned hereinbefore and in particular, firstly, to propose a gas generator comprising reagent gases that limits the mechanical stresses on the airbag at the start of the operation/deployment, while offering good performance once the airbag is deployed.

To this end, a first aspect of the invention therefore relates to a gas generator comprising:
- a first chamber having first pressurized gases and a first outlet port closed by first breakable sealing means,
- a second chamber with second pressurized gases and a second outlet port closed by second breakable sealing means,
- a diffusion zone, arranged to receive and diffuse towards an airbag the first pressurized gases and the second pressurized gases when the first breakable sealing means and the second breakable sealing means are broken, wherein the first pressurized gases and the second pressurized gases are arranged to react together once they are mixed,
characterized in that the gas generator comprises at least one deflector arranged to impose on the first pressurized gases a first radial discharge direction in the separate diffusion zone of a second radial discharge direction of the second pressurized gases.

The gas generator according to the implementation hereinbefore comprises a deflector that imposes distinct discharge directions, that is that the respective trajectories or flows of the first pressurized gases and second pressurized gases do not meet or barely meet. As a result, the mixing of the first pressurized gases and the second pressurized gases in the diffusion zone is limited. In particular, at the very beginning of the operation this impairs and limits the combustion reaction capacity between the first pressurized gases and the second pressurized gases and therefore this impairs and limits the quantity of first pressurized gases that will react with the second pressurized gases, in particular inside the generator. Since the combustion reaction is reduced, the stress exerted on the airbag in order to deploy it is also reduced. Furthermore, the reagent gases that have not reacted at the beginning of the operation will react once well mixed in the airbag, which makes it possible to better pressurize it once deployed. In a global manner, the reaction energy that is not dissipated for unfolding/deploying the airbag at the start of the operation is released and/or produced once the airbag is deployed. The deflector, by imposing a different radial discharge direction on the first pressurized gases and the second pressurized gases, makes it possible to ensure that:
- the still folded airbag is stressed by colder gases (and that occupy a small volume because they have not reacted together) in order to unfold,
- a larger portion of the mixing is done in the airbag during deployment,
- a larger portion of the combustion reaction between first pressurized gases and second pressurized gases is done in the airbag, which is therefore better pressurized,
- less energy is lost by the system since, as there is less combustion inside the gas generator, there are fewer heat losses; indeed, the airbag absorbs less heat than the different metal parts of the gas generator.

In other words, the invention relates to a gas generator comprising:
- a first chamber having first pressurized gases and a first outlet port closed by first breakable sealing means,
- a second chamber with second pressurized gases and a second outlet port closed by second breakable sealing means,
- a diffusion zone, arranged to receive and diffuse towards an airbag the first pressurized gases and the second pressurized gases when the first breakable sealing means and the second breakable sealing means are broken, wherein the first pressurized gases and the second pressurized gases are arranged to react together once they are mixed,
characterized in that the gas generator comprises at least one deflector arranged to impose on the first pressurized gases a first discharge trajectory in the separate diffusion zone of a second discharge trajectory of the second pressurized gases.

According to one embodiment, said at least one deflector may be arranged to limit mixing between the first pressurized gases and the second pressurized gases in the diffusion zone. According to this implementation, the first pressurized gases and the second pressurized gases mix less in the diffusion zone, therefore they will react less, and at the start of the operation, they are cold gases that have not reacted that will exert a force on the airbag to unfold it. The forces are reduced with respect to the case of a known gas generator wherein the gases react with one another from the start of the operation more significantly in the diffusion zone (hotter gases and occupying more volume, therefore having more pressure).

According to one embodiment, the diffusion zone may be a diffusion chamber. In other words, the diffusion zone may be a space delimited by a wall, intended to receive the first pressurized gases and the second pressurized gases.

According to one embodiment, the diffusion zone may be arranged between, or delimited by, the first chamber and the second chamber. According to one embodiment, the diffusion zone can define in the gas generator a single receiving and diffusion space for diffusing first pressurized gases and second pressurized gases toward the airbag.

According to one embodiment, said at least one deflector may be intended to impose a first radial diffusion direction on the first pressurized gases and a second radial diffusion direction on the second pressurized gases. According to an embodiment, the first radial diffusion direction may be distinct, and/or opposite, and/or different from the second radial diffusion direction. In a plane transverse to an axial direction of the gas generator, a projection of the first radial diffusion direction and a projection of the second radial diffusion direction can be offset by at least 45°, by at least 90°, and by at least 150°.

According to one embodiment, said at least one deflector may be arranged directly facing an outlet of the first and/or second chamber.

According to one embodiment, said at least one deflector may be arranged to impose the first trajectory from the first chamber (or the outlet thereof) toward the diffusion zone and/or to impose the second trajectory from the second chamber (or the outlet thereof) toward the diffusion zone.

According to one embodiment, said at least one deflector may be movable or articulated between a closed position before the generator is ignited and an open position after the gas generator is ignited.

According to one embodiment, said at least one deflector may be a deformable tab formed in a wall of the first chamber and/or of the second chamber. Such a deformable tab may be arranged to deform plastically, and may be arranged to tilt about a hinge or attachment portion to the chamber.

According to one embodiment, said at least one deflector may be arranged to occupy:

before the operation of the gas generator: a support position wherein it can cooperate with the first or second breakable sealing means to close the first or the second outlet port, respectively, during the operation of the gas generator: a screen position, wherein, after breaking the first or second frangible sealing means, the deflector, moved (or tilted or inclined or tipped) from the support position, can form a screen for the first pressurized gases and/or the second pressurized gases.

According to one embodiment, the gas generator may comprise a first deflector and a second deflector.

According to an embodiment, the gas generator may comprise a first deflector and a second deflector, the first and the second deflector are articulated to deploy in opposite directions along parallel axes so as to move and/or deform in parallel. In other words, the first and the second deflector are each anchored on the gas generator via a hinge portion and can tilt toward opposite or radially opposite directions, the axis of rotation of the first and second deflector being parallel. In particular, in a cross sectional view along a plane perpendicular (or substantially perpendicular) to the axis of rotation of the first deflector and of the second deflector and during the opening, the first deflector and the second deflector both pivot in the same direction of rotation (the first deflector and the second deflector both pivot in the clockwise or anticlockwise direction).

According to one embodiment, the first deflector and the second deflector can be formed by inclined tongues (in the screen position, after triggering the gas generator).

According to one embodiment, the first deflector and the second deflector may be arranged to impose opposite, and preferably radially opposite, discharge directions to the first pressurized gases and to the second pressurized gases.

According to one embodiment, the first deflector and the second deflector may be formed respectively by a portion of the first chamber and by a portion of the second chamber, and the first chamber the second chamber may have identical structures.

According to one embodiment:

the first deflector may comprise a first anchoring or hinge portion on the first chamber, and the second deflector may comprise a second anchoring or hinge portion on the second chamber, the first anchoring or hinge portion and the second anchoring or hinge portion may be angularly offset with respect to an axis of the gas generator. In other words, the deflectors (or tongues) are oriented in distinct radial directions in order to impose the discharge directions or trajectories.

According to one embodiment, the angular offset can be at least 45°, preferably at least 90° and very preferentially at least 150°. It is even possible to provide an offset of 180°.

According to one embodiment, the first breakable sealing means and/or the second breakable sealing means may comprise a cover, preferably a supported cover, preferably a cover supported by said at least one deflector. The first breakable sealing means and the second breakable sealing means may be located in the first chamber and in the second chamber, respectively.

According to one embodiment, the gas generator may comprise at least one pyrotechnic igniter, arranged between the first chamber and the second chamber. Two pyrotechnic igniters may be provided, arranged between the first chamber and the second chamber. Said at least one pyrotechnic igniter may open into the diffusion zone.

According to one embodiment, the gas generator may comprise a diffuser delimiting the diffusion zone, arranged between the first chamber and the second chamber. The diffuser may typically be a metal wall comprising diffusion holes. According to an axial direction of the gas generator, the gas diffuser may include diffusion holes over at least 200°, at least 230°, at least 260°.

A second aspect of the invention relates to a safety module comprising:

a gas generator according to the first aspect, a housing, an airbag, wherein said at least one deflector may be arranged to:

direct the first pressurized gases, preferably hydrogen, towards the airbag, and/or, direct the second pressurized gases, preferably oxygen, towards the housing or a wall of the airbag adjoining the housing, or a dead zone of the diffusion zone.

A third aspect of the invention relates to a motor vehicle comprising a gas generator according to the first aspect, or the safety module of the second aspect.

DESCRIPTION OF THE FIGURES

Other features and advantages of the present invention will become more apparent upon reading the following detailed description of an embodiment of the invention, which is provided by way of example but in no manner limited thereto, and illustrated by the attached drawings, in which:

FIG. 1 represents a perspective view of a gas generator according to the invention, comprising two chambers separated by a central diffusion zone also supporting two ignition sub-assemblies;

FIG. 2 represents a cross sectional view of the gas generator of FIG. 1 to show, in particular, the diffusion zone;

FIG. 3 represents a perspective view of the bottom of the two chambers of the gas generator of FIG. 1;

FIG. 4 shows a schematic cross sectional view of the gas generator of FIG. 1, during operation;

FIG. 5 shows a graph with comparative test curves for a gas generator of FIG. 1 and a gas generator of the background art.

DETAILED DESCRIPTION OF EMBODIMENT(S)

FIG. 1 represents an elongated gas generator, generally comprising a first chamber 10, a second chamber 20 and a diffuser 30 arranged between the first chamber 10 and the second chamber 20.

The diffuser 30 comprises diffusion holes 31, and supports two ignition sub-assemblies 41 and 42 forming activation means 40 of the gas generator.

The gas generator of FIG. 1 therefore has a general elongated form with an axial direction Ax, and the two ignition sub-assemblies 41 and 42 are oriented perpendicularly to the axial direction Ax. Furthermore, the diffuser 30 has diffusion holes 31 distributed over more than 250° with respect to the axial direction Ax.

FIG. 2 represents a cross-sectional view of the gas generator of FIG. 1 to show, in particular, the internal structure:

the first chamber 10 contains first pressurized gases, herein for example hydrogen (with for example between 30% and 50% hydrogen, the remainder being argon and helium for example), the second chamber 20 contains second pressurized gases, herein for example oxygen (with for example between 15% and 25% oxygen, the remainder being argon and helium for example), the diffuser 30 comprises a support and opening mechanism, intended to be controlled by the ignition sub-assemblies 41 and 42.

In more detail, the first chamber 10 is formed by a first chamber bottom 12 and a first cap 13 having a filling orifice closed by a first pin 18, the first chamber 10 comprises a first outlet port 16 (visible on FIG. 3) formed by a first tongue 15 (visible in FIGS. 2 and 3) and closed by a first cover 14. FIG. 3 shows the presence of a first secondary outlet orifice 17, also closed by the first cover 14, which can serve as a safety valve. It can be noted that the first tongue 15 has an elongated U or horseshoe shape and is attached to the first chamber bottom 12 by an attachment portion that forms a type of hinge: the first tongue 15 can be deformed and tilted or folded around the attachment portion.

The second chamber 20 is formed in turn by a second chamber bottom 22 and a second cap 23 having a filling orifice closed by a second pin 28, the second chamber 20 comprises a second outlet port (visible in FIG. 3) formed by a second tongue 25 (visible in FIGS. 2 and 3) and sealed by a second cover 24. It can be noted that the second tongue 25 has an elongated U or horseshoe shape and is attached to the second chamber bottom 22 by an attachment portion 27 which forms a type of hinge: the second tongue 25 can be deformed and tilted or folded around the attachment portion.

As regards the diffuser 30, this latter supports the ignition sub-assemblies 41 and 42 and encloses a support and opening mechanism, comprising especially a slider 51 which supports (in the position represented in FIG. 2 the first tongue 15 and the second tongue 25. Thus, the first cover 14 and the second cover 24 are well supported respectively by the first tongue 15 and the second tongue 25, blocked by the slider 51. If the gas generator needs to be activated, the ignition sub-assembly 41 is ignited, which pushes the slider 51 downwardly, so that the first tongue 15 and the second tongue 25 are no longer blocked by the slider 51 and can tilt inwardly of the diffuser 30, which causes the first cover 14 and the second cover 24 to rupture. The first pressurized gases 11 and the second pressurized gases 21 may be discharged towards the diffusion zone defined in the diffuser 30 and escape from the diffuser 30 to head into an airbag. The ignition sub-assembly 42 may be used to displace the internal elements of the diffuser in order to modify a total passage surface, in order to obtain a modified discharge, based for example on an impact force to be cushioned.

As seen hereinbefore, the first pressurized gases 11 and the second pressurized gases 21 can react together and during the operating sequence, it is possible to note the points below:

during storage, the first pressurized gases 11 and the second pressurized gases 21 are each in their respective chamber, during activation, the first tongue 15 and the second tongue 25 tilt and force the rupture of the first cover 14 and of the second cover 24, from that moment on, the first pressurized gases 11 and the second pressurized gases 21 can be discharged towards the diffusion zone, then, the first pressurized gases 11 and the second pressurized gases 21 escape from the diffuser 30 and force the airbag to start to unfold, the airbag is deployed and is gradually pressurized, the first pressurized gases 11 and the second pressurized gases 21 can react together throughout the operation, as soon as the mixing conditions allowing a combustion reaction of the first and second pressurized gases are met, that is in the diffusion zone (in the diffuser 30) and/or in the airbag.

It is also possible to note that just after the rupture of the first cover 14 and of the second cover 24, the airbag is forced to start unfolding and, in turn, pushes the protective housing that must also open: the forces exerted on the airbag and on the housing are sizable and must be managed to prevent excessively violent ruptures or deployment. It must be borne in mind that the first pressurized gases 11 and the second pressurized gases 21 may react together, which increases the forces exerted on the parts in question.

For this purpose, it is proposed to direct the first pressurized gases 11 and the second pressurized gases 21 in a specific manner to limit their combustion reaction in the first moments of the operation. In more detail, it is intended that the first tongue 15 and the second tongue 25 are used to form deflectors which impose trajectories on the first pressurized gases 11 and the second pressurized gases 21 in the diffusion zone which are different. Thus, the mixing of the first pressurized gases 11 and the second pressurized gases 21 is reduced, which reduces the possibilities of combustion reaction.

The proposed construction is to angularly orient the first tongue 15 and the second tongue 25 in accordance with different radial directions, as shown in FIG. 3, wherein the first tongue 15 and the second tongue 25 are "head-to-tail" or opposite. It is possible to provide for orientations other than the 180° shown in FIG. 3. In summary, the first tongue

15 and the second tongue 25 form deflectors that impose, in the diffuser 30, a first radial discharge direction on the first pressurized gases and a second radial discharge direction on the second pressurized gases, the first radial discharge direction being different (and in this case even opposite) to the second radial discharge direction.

Consequently, in the diffusion zone, the first pressurized gases 11 and the second pressurized gases 21 follow different paths as soon as they exit the first chamber 10 and the second chamber 20, which limits their mixing, in particular inside the diffuser 30.

As shown in FIG. 4, at the very beginning of the operation of the gas generator of FIG. 1 (with the airbag 60 still folded), the first pressurized gases 11 exit the first chamber 10 in a radial direction oriented upwardly, and the second pressurized gases 21 exit the second chamber 20 in a radial direction oriented downwardly.

The applicant noticed that it was advantageous to choose to direct the hydrogen directly toward the airbag 60, and oxygen directly toward the wall of the housing 70. In fact, in such a case, the combustion reaction is incomplete and less exothermic, which further limits the rate of rise in pressure. In more detail, oxygen is the limiting factor, and the hydrogen directed to the airbag first cannot fully react. The products of the combustion reaction are water ($H_2O$) and hydrogen peroxide ($H_2O_2$). Heat production is lower and the gases are heated less and therefore less pressurized. The mechanical aggressiveness of the gases leaving the diffuser 30 is therefore reduced.

FIG. 5 shows a graph with comparative test curves for a gas generator of FIG. 1 with the tongues 15 and 25 of FIG. 3, "head to tail" (Test 1) and a gas generator of the background art with tongues oriented in the same direction which open to impose the same radial discharge direction on the first pressurized gases and the second pressurized gases (Reference). The gas generators were tested in a closed enclosure, and the pressure was measured as a function of time. The pressure curve of the gas generator of FIG. 1 is the solid line, the pressure curve of the gas generator of the background art is the dotted line. The gas generator of the background art is typically free of deflectors which limit the mixing of the gases with one another. In particular, the gas generator of the background art has no device which imposes opposite trajectories which prevent the first pressurized gases 11 from mixing with the second pressurized gases 21.

It may be noted that the curve of the gas generator of FIG. 1 has a smaller slope between 0 ms and 10 ms, which clearly confirms lower mechanical aggressiveness on the airbag when the deployment begins. It is also possible to note a higher final pressure after 80 ms. Indeed, the first pressurized gases 11 that are not mixed with the second pressurized gases 21 at the start of the operation finally mix in the airbag 60 and react therein, which releases the energy directly into the airbag: there are fewer losses, and the final pressure is greater. In particular, with the invention, as there is less combustion in the diffuser 30, there are fewer heat losses since the airbag absorbs less heat than the different metal parts of the gas generator.

INDUSTRIAL APPLICATION

A gas generator according to the present invention, and its manufacture, are capable of industrial application.

It will be understood that various modifications and/or improvements which are obvious to a person skilled in the art may be made to the different embodiments of the invention described in the present description without departing from the scope of the invention. In particular, it may be noted that the deflectors herein are tongues directly formed in the wall of the chamber, but other implementations may be provided, with additional or distinct components. It is also possible to provide complex shapes, such as U-shaped channels for guiding the gases which exit one of the chambers. Other opening devices can be considered and also a single ignition sub-assembly.

The invention claimed is:

1. A gas generator comprising:
a first chamber having first pressurized gases and a first outlet port closed by first breakable sealing means,
a second chamber with second pressurized gases and a second outlet port closed by second breakable sealing means,
a diffusion zone, arranged to receive and diffuse towards an airbag the first pressurized gases and the second pressurized gases when the first breakable sealing means and the second breakable sealing means are broken, wherein the diffusion zone is disposed between the first chamber and the second chamber and along a longitudinal axis of the gas generator,
wherein the first pressurized gases and the second pressurized gases are arranged to react together once they are mixed, and
wherein the gas generator comprises a first deflector arranged to impose on the first pressurized gases a first radial discharge trajectory relative to the longitudinal axis in the diffusion zone and a second deflector to impose on the second pressurized gases a second radial discharge trajectory relative to the longitudinal axis in the diffusion zone that is opposite the first radial discharge trajectory,
wherein the first deflector and the second deflector are arranged to limit a mixture between the first pressurized gases and the second pressurized gases in the diffusion zone.

2. The gas generator according to claim 1, wherein each of the first deflector and the second deflector includes a deformable tab formed in a wall of the first chamber and the second chamber, respectively.

3. The gas generator according to claim 2, wherein each of the first deflector and the second deflector is arranged to occupy:
before operation of the gas generator: a support position wherein each of the first deflector and the second deflector cooperates with one of the first and second breakable sealing means to close one of the first outlet port and the second outlet port, respectively,
during the operation of the gas generator: a screen position, wherein, after breaking the first or second breakable sealing means, each of the first deflector and the second deflector is moved from the support position and forms a screen for the first pressurized gases and/or the second pressurized gases.

4. The gas generator according to claim 1, wherein the first deflector and the second deflector are formed by inclined first and second tongues.

5. The gas generator according to claim 4, wherein the first and second tongues deflect the first and second pressurized gases, respectively, in first and second radial diffusion directions, respectively.

6. The gas generator according to claim 1, wherein the first deflector and the second deflector are formed respectively by a portion of the first chamber and by a portion of the second chamber, and the first chamber and the second chamber have identical structures.

7. The gas generator according to claim 1, wherein:

the first deflector comprises a first anchoring or hinge portion on the first chamber, and the second deflector comprises a second anchoring or hinge portion on the second chamber.

8. The gas generator according to claim 1, wherein the first breakable sealing means and/or the second breakable sealing means comprise a cover supported by the first deflector and the second deflector.

9. The gas generator according to claim 1, comprising at least one pyrotechnic igniter, arranged between the first chamber and the second chamber.

10. The gas generator according to claim 1, comprising a diffuser delimiting the diffusion zone, arranged between the first chamber and the second chamber.

11. A safety module, comprising:

a gas generator according to claim 1, a housing, and an airbag, wherein the first deflector is arranged to direct the first pressurized gases towards the airbag, and the second deflector is arranged to direct the second pressurized gases towards the housing.

12. The gas generator according to claim 1, wherein the diffusion zone is a diffusion chamber delimited by a wall, the diffusion chamber for receiving the first and second pressured gases.

13. The gas generator according to claim 1, the diffusion zone is arranged between and delimited by the first chamber and the second chamber, the diffusion zone defining in the gas generator a single receiving and diffusion space for diffusing the first pressurized gases and the second pressurized gases toward the airbag.

14. The gas generator according to claim 1, wherein the first deflector and the second deflector are operative to impose a first radial diffusion direction on the first pressurized gases and a second radial diffusion direction on the second pressurized gases, the first radial diffusion direction being distinct from the second radial diffusion direction.

* * * * *